United States Patent
Murti et al.

(10) Patent No.: US 11,797,206 B2
(45) Date of Patent: Oct. 24, 2023

(54) HASH MIGRATION USING A GOLD IMAGE LIBRARY MANAGEMENT SYSTEM

(71) Applicant: EMC IP Holding Company LLC, Hopkinton, MA (US)

(72) Inventors: Arun Murti, Mission Viejo, CA (US); Mark Malamut, Aliso Viejo, CA (US); Stephen Smaldone, Woodstock, CT (US)

(73) Assignee: EMC IP Holding Company LLC, Hopkinton, MA (US)

( * ) Notice: Subject to any disclaimer, the term of this patent is extended or adjusted under 35 U.S.C. 154(b) by 280 days.

(21) Appl. No.: 17/200,506

(22) Filed: Mar. 12, 2021

(65) Prior Publication Data

US 2022/0197526 A1 Jun. 23, 2022

Related U.S. Application Data

(63) Continuation-in-part of application No. 17/124,957, filed on Dec. 17, 2020, now Pat. No. 11,513,904.

(51) Int. Cl.
*G06F 3/06* (2006.01)
*G06F 9/50* (2006.01)

(52) U.S. Cl.
CPC ............ *G06F 3/0641* (2013.01); *G06F 3/067* (2013.01); *G06F 3/0608* (2013.01); *G06F 3/0619* (2013.01); *G06F 3/0647* (2013.01); *G06F 9/5083* (2013.01)

(58) Field of Classification Search
CPC .... G06F 3/0641; G06F 3/0608; G06F 3/0619; G06F 3/0647; G06F 3/067; G06F 9/5083
See application file for complete search history.

(56) References Cited

U.S. PATENT DOCUMENTS

| | | | |
|---|---|---|---|
| 8,738,860 B1* | 5/2014 | Griffin | G06F 12/0897 711/122 |
| 10,956,346 B1* | 3/2021 | Ben-Yehuda | G06F 13/4027 |
| 2011/0258404 A1* | 10/2011 | Arakawa | G06F 3/0689 711/170 |
| 2012/0084305 A1* | 4/2012 | Inoue | G06F 16/583 707/E17.014 |
| 2014/0195720 A1* | 7/2014 | Akella | G06F 12/0246 711/103 |
| 2016/0188229 A1* | 6/2016 | Rabinovich | G06F 11/1469 711/114 |
| 2020/0110553 A1* | 4/2020 | Olarig | G06F 3/0658 |
| 2021/0034674 A1* | 2/2021 | Palsetia | G06F 16/9017 |

\* cited by examiner

*Primary Examiner* — Merilyn P Nguyen
(74) *Attorney, Agent, or Firm* — Staniford Tomita LLP

(57) ABSTRACT

Embodiments for migrating hash values for backup data blocks in a network of data protection targets (DPTs) and a common data protection target implementing a Gold image library management system in which backups of Gold images used as templates for physical machines and virtual machines are stored on the CDPT. The CDPT and each DPT stores backup data split into chunks that are uniquely identified by a respective hash of its contents, and maintains data structures comprising the hash, chunk size, chunk data, and a list of DPT and CDPT identifiers. The hashes are partitioned into a set of buckets in the CDPT. A Bloom filter is generated for each bucket of hashes, and stored in each DPT so that each DPT stores Bloom filters for all CDPTs in the network. Each DPT checks its list of hashes against the Bloom filters in each of the DPTs to determine whether to keep or free chunks of data.

18 Claims, 12 Drawing Sheets

200

| | 202 | 204 | 206 |
|---|---|---|---|
| | OPERATING SYSTEM | WINDOWS | Kernel Interfaces, Drivers Data Structures |
| | | LINUX | Kernel Interfaces Drivers Data Structures |
| | APPLICATIONS | DATABASE (e.g., SQL) | Data Structures APIs, Scripts/Macros |
| | | DATABASE (e.g., Oracle) | Data Structures APIs, Scripts/Macros |
| | | E-MAIL | Data Structures APIs, Scripts/Macros |
| | | WORD PROCESSOR | Data Structures APIs, Scripts/Macros |

FIG. 2

HASH MIGRATION USING A GOLD IMAGE LIBRARY MANAGEMENT SYSTEM

CROSS-REFERENCE TO RELATED APPLICATIONS

The present application is a Continuation-In-Part application and claims priority to U.S. patent application Ser. No. 17/124,957 filed on Dec. 17, 2020, entitled "Gold Image Library Management System to Reduce Backup Storage and Bandwidth Utilization," now issued as U.S. Pat. No. 11,513,904 on Nov. 29, 2022, and assigned to the assignee of the present application.

TECHNICAL FIELD

This invention relates generally to computer backup systems, and more specifically to performing hash migration for Gold image backups in Common Data Protection Storage devices.

BACKGROUND

Large-scale networks process and store large amounts of user data created by different applications and often deployed on different machines and operating systems (OS). Routine backing up of data is a critical task for any enterprise or organization, and well established products, such as DellEMC's Data Domain system are often used for providing deduplicated backup and restoration functions. Backing up large-scale network data involves backing up both the growing and changing (dynamic) user data as well as the relatively static OS and application data, structures, and definitions.

Customers often deploy a set of standard server configurations known as 'Gold images' multiple times. These Gold images may be pure OS images or they may be application/OS combinations such as a SQL Server on MS-Windows, Oracle on Linux, and so on. Gold image data is static (structural/definition) data that is deployed many times by users who wish to reuse the same code across many different deployed computers or machines. As these Gold images are placed into service (deployed) in user production systems, they help generate user content data, which is subject to data protection processes that store the Gold image data along with the user data.

Because of the sheer amount of data stored today and the increasing cost of computing resources, one of the key goals of data protection is to reduce the amount of data protection storage resources that are consumed. Present systems typically back up the Gold image (OS/application structural) data along with the content data simultaneously and at regular intervals. Because the Gold image data is static and deployed many times (e.g., used by many VMs) as compared to the more dynamic content data, repeated and regular storage of this Gold image data represents a large element of duplicated and wasted storage and processing resources.

What is needed, therefore, is a data protection system where the data related to Gold images is centralized and backed up once rather than repeatedly due to multiple deployments, in order to reduce overall data protection resource usage.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 2 illustrates a table 200 showing a composition of a Gold image library storing OS and application data, under some embodiments.

DETAILED DESCRIPTION

Figure 1:
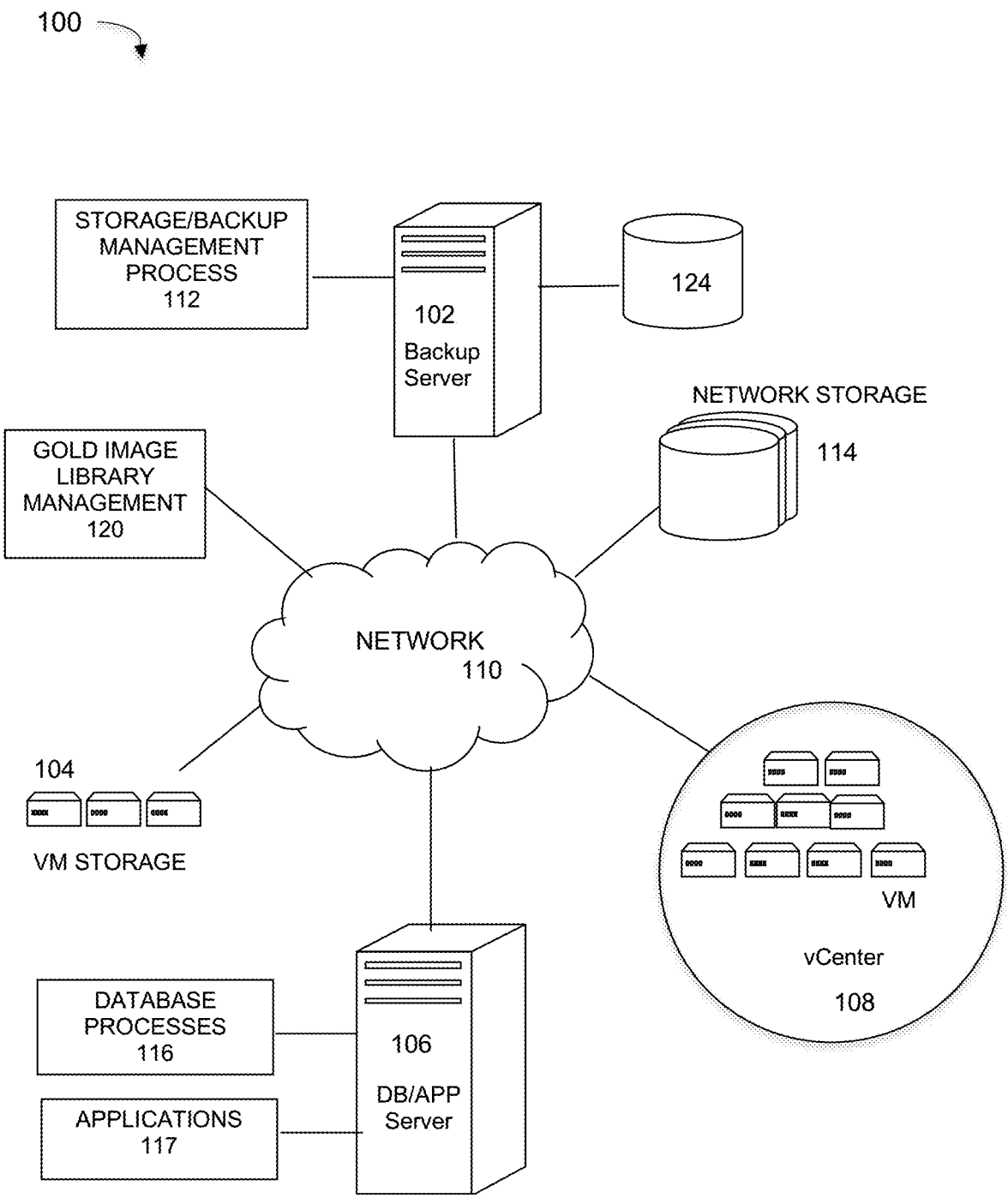
FIG. 1 is a diagram of a network implementing a Gold image library management system for data processing systems, under some embodiments.

A detailed description of one or more embodiments is provided below along with accompanying figures that illustrate the principles of the described embodiments. While aspects are described in conjunction with such embodiment(s), it should be understood that it is not limited to any one embodiment. On the contrary, the scope is limited only by the claims and the described embodiments encompass numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the certain methods and processes described herein. Applications may also be downloaded, in whole or in part, through the use of a software development kit or toolkit that enables the creation and implementation of the described embodiments. In this specification, these implementations, or any other form that embodiments may take, may be referred to as techniques. In general, the order of the steps of disclosed processes may be altered within the scope of the embodiments.

Some embodiments involve data processing in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a Gold image library management system in which Gold images are centralized and backed up when needed, rather than constantly backed up with the user content data. By using this central repository, a nearly infinite number of deployed instances of these Gold images can be protected, thereby reducing the overall data protection footprint of the system.

FIG. 1 is a diagram of a network implementing a Gold image library management system for data processing systems, under some embodiments. In system 100, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs may be provided to serve as backup targets. FIG. 1 illustrates a virtualized data center (vCenter) 108 that includes any number of VMs for target storage. The VMs or other network storage devices serve as target storage devices for data backed up from one or more data sources, such as a database or application server 106, or the data center 108 itself, or any other data source, in the network environment. The data sourced by the data source may be any appropriate data, such as database 116 data that is part of a database management system or any appropriate application 117. Such data sources may also be referred to as data assets and represent sources of data that are backed up using process 112 and backup server 102.

The network server computers are coupled directly or indirectly to the network storage 114, target VMs 104, data center 108, and the data sources 106 and other resources through network 110, which is typically a public cloud network (but may also be a private cloud, LAN, WAN or other similar network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

The database 116 and other applications 117 may be executed by any appropriate server, such as server 106. Such servers typically run their own OS, such as MS Windows, Linux, and so on. The operating systems and applications comprise program code that defines the system and applications. As such, this code comprises data that is backed up and processed by backup server 102 during routine data protection backup and restore processes that involve all of the data of system 100.

The application and OS data are well defined by the manufacturers of these programs and comprise all the program data prior to or minus any user data generated by a user using the application or OS. This structural, non-content data is referred to as "Gold image" data because it is core data related to the structure, operation, and deployment of the applications and operating systems, rather than user-generated data. For example, Gold image data may comprise kernels, interfaces, file systems, drivers, data element definitions, macros, scripts, configuration information, and other data that comprises the software 'infrastructure' of the system, rather than the software content of the system. Such data generally does not change over time, as applications, and operating systems are revised or upgraded relatively infrequently, certainly when compared to user content additions or revisions. The application and OS data only needs to be updated when new versions are introduced, or when patches, bug fixes, drivers, virus definitions, and so on are added.

In current data processing and backup systems, Gold image data is treated as integrated with or closely coupled to the actual user content data, and is thus backed up and restored as part of an entire body of data that mixes the infrastructure data with the content data of the system. In many cases, this can greatly increase the total amount of data that is subject to backup and restore processes of the system. Thus, current data protection schemes use a one-to-one relationship in which data sources are backed up to a single data protection target. They do not define or use dual or multiple targets, that is, one for base (Gold image) data and a separate one for operational data (content data).

In an embodiment, Gold image data is maintained or stored in a Gold image library that defines a set of protected base image that can be shared among stored content data sets, but that is kept separate from those more dynamic data sets as they are processed routinely by the backup and restoration processes.

FIG. 2 illustrates a table 200 showing a composition of a Gold image library storing OS and application data, under some embodiments. As shown in table 200, the Gold image library comprises a repository storing base data for fundamental system programs, such operating systems and applications, as well as any other infrastructural programs. Column 202 lists the one or more operating systems, and the one or more different applications. Any number of different operating systems and applications may be used, and the example of table of FIG. 2 two different operating systems (Windows and Linux) and four example applications: SQL and Oracle databases with e-mail and word processing applications, as listed in column 204. The data elements in column 206 of table 200 represent the various programs, software definitions, and data for elements of the operating systems and applications that are written or defined by the manufacturer and sold or provided to the user under normal software release or distribution practices. FIG. 2 is intended only to provide an example Gold image library, and embodiments are not so limited. Any structure or data composition may be used to define and store the Gold image data comprising the data system.

The base or system data stored in the Gold image library, such as in table 200 comprises a base set of protected data that is stored separately from the user content data that is generated by the deployment and use of the operating systems and applications 204. In an embodiment, system 100 includes a Gold image library management component or process 120 that centralizes and stores the Gold image data when it is needed, rather than on the constant basis imposed by the backup management process 112. By using this central repository, a nearly infinite number of deployed instances of these Gold Images can be protected and thereby reduces the overall data protection footprint.

For the embodiment of FIG. 1, the Gold image library manager 120 may be implemented as a component that runs within a data protection infrastructure, and can be run as an independent application or embedded into an instance of data protection software 112 or a data protection appliance. Any of those implementations may be on-premise within a user's data center or running as a hosted service within the cloud 110.

As shown in FIG. 1, in a typical user environment there are a collection of a clients that consist of VMs and/or physical machines. Typically, larger users will create a set of Gold images that they use repeatedly as the baseline for these clients so as to standardize their OS and application deployments. For example, a Gold image library may include Microsoft (MS) Windows 2012 plus SQL Server 2008, MS Windows 2016 plus SQL Server 2017, SLES 12 plus Oracle 8i, or any other combinations that users choose to use as their set of standard deployments. By reusing these standard Gold images, customers can speed up the deployment of clients and certify these deployments for security or other reasons. Users may deploy these Gold images many tens or hundreds of times. The more often a standard deployment can be used, the more control users can exercise over their environment.

Figure 3A:
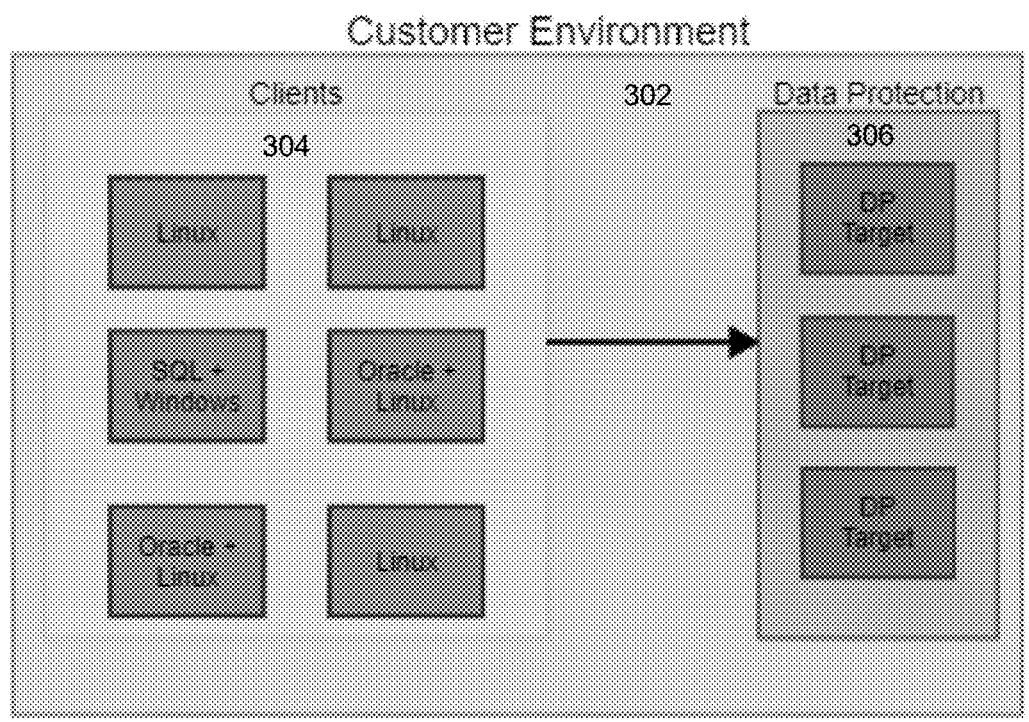
FIG. 3A illustrates an example user environment with VM clients running various OS and database application combinations for protection on a single data protection (DP) target set.

A data protection system for protecting deployed systems can be built in a variety of ways. FIG. 3A illustrates an example user environment with VM clients running various OS and database application combinations for protection on data protection (DP) clients, and that implements a Gold library management process, under some embodiments. As shown in FIG. 3A, user (or 'customer') environment 302 includes a number of clients 304 each comprising a machine running an OS, application, or combination OS plus application. The clients 304 represent data sources that are used and ultimately produce data for backup to data protection targets or storage devices 306. This represents what may be referred to as a 'production' environment.

Figure 3B:
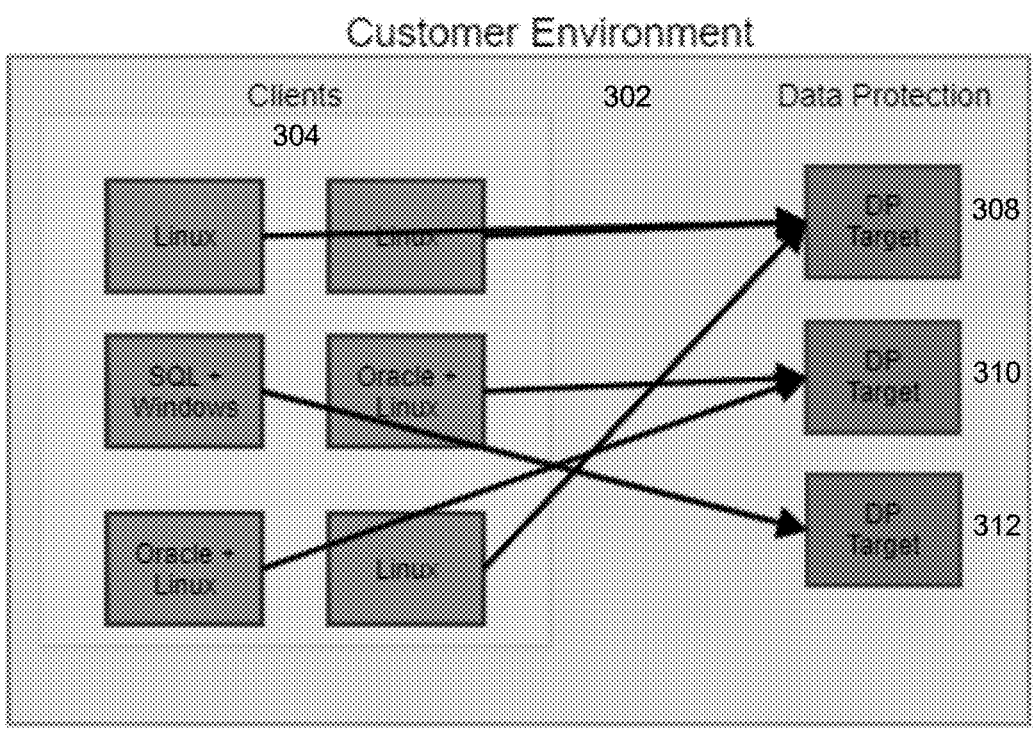
FIG. 3B illustrates an example user environment with VM clients running various OS and database application combinations for protection on individual data protection (DP) targets.

For the example of FIG. 3A, three of the clients are Linux only clients, while others are a combination, such as Windows plus SQL or Linux plus Oracle, and so on. The data from these clients is stored in one or more data protection targets that may be provided as a single logical data protection target 306 as shown in FIG. 3A. Alternatively, the data protection targets may be provided as individual data protection targets, as shown in FIG. 3B. Thus, as shown in the example of FIG. 3B, certain OS and application clients are backed up to DP target 308, others are backed up to DP target 310, and the remainder are backed up to DP target 312. In one embodiment, a DP target may be implemented as a Data Domain Restorer (DDR) appliance or other similar backup storage device.

The base OS and/or application data for each client 304 without any user content data comprises a Gold image for that client, and is typically stored along with the user content data in an appropriate DP target. As stated earlier, however, this Gold image data is static but is yet stored repeatedly based on the DP schedule for the user content data. Due to this reuse of Gold images by users, there typically is a substantial amount of duplicate data that ends up in a data protection environment. In an attempt to minimize this duplication of data, user presently may assign all data sources that use the same Gold image or images to a single data protection target. Doing such requires a significant amount of customer management, and can become difficult to manage and maintain over time as data sources expand and need to be migrated to new data protection targets.

To eliminate or at least alleviate the amount of duplicated data stored across multiple DP targets when Gold image is protected, the Gold image library management system 120 uses a common dedicated DP target for the protection of Gold images. Each regular DP target can then deduplicate its own data against this common DP target to save only new Gold image data rather than repeatedly re-storing existing Gold image data with the user content data on DP targets. This process effectively adds another deduplication function on any user data deduplication process provided by the DP system, and helps eliminate all or almost all sources of duplicate data storage.

Figure 4:
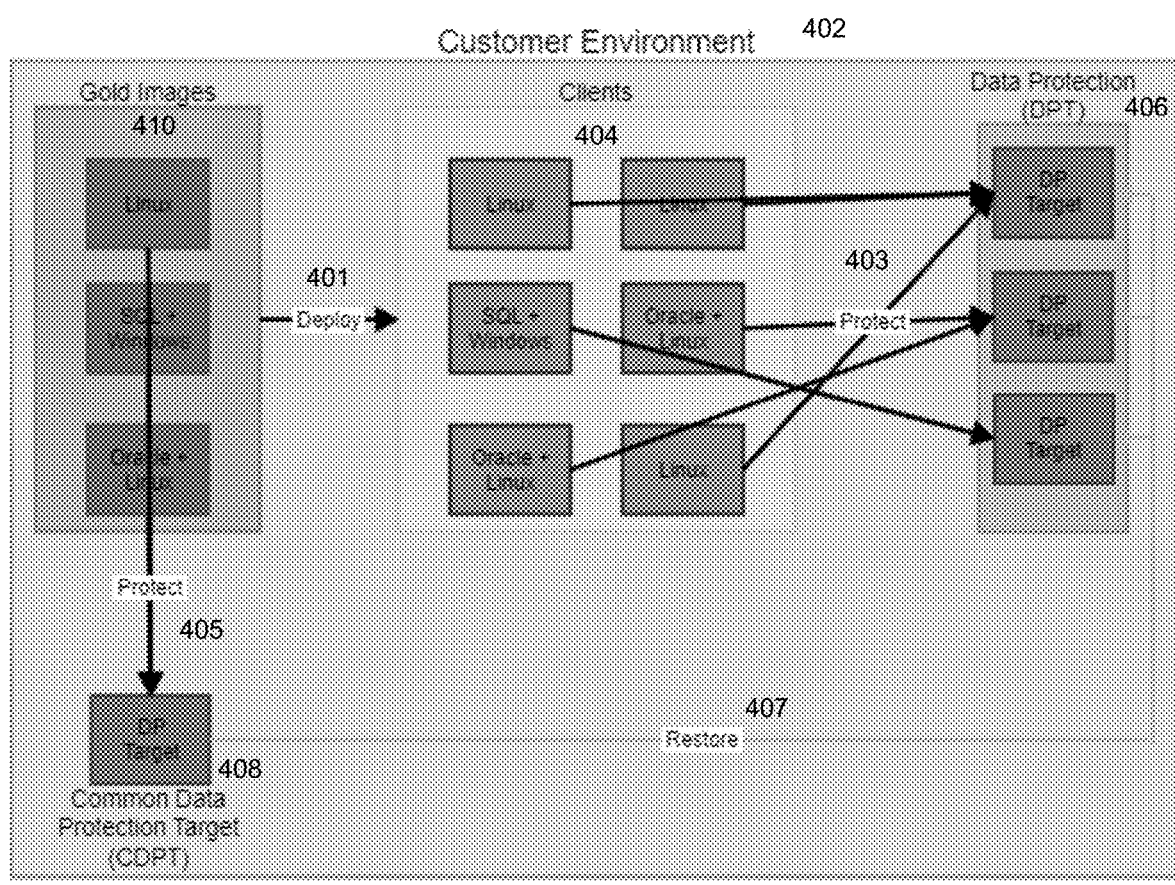
FIG. 4 illustrates a common data protection target (CDPT) storing Gold image data for network clients, under some embodiments.

FIG. 4 illustrates a common data protection target (CDPT) storing Gold image data for network clients, under some embodiments. As shown in FIG. 4, user environment 402 includes different OS and application clients 404 with their user content data stored in DP targets 406 under an appropriate protection scheme 403, as described above. The Gold images 410 comprise the base code for each of the OSs and applications that are implemented on the clients through a deployment operation. When an OS and application are deployed 401, they are loaded onto appropriate physical or virtual machines and configured or instantiated for use by the user to generate content data that is then periodically stored through protection process 403 onto data protection targets 406. For this embodiment, the Gold images are not stored with the client data in DP protection storage 406. Instead, the user environment 402 includes a Common Data Protect Target (CDPT) system 408 that stores only the Gold images 410 through its own protection process 405.

During a normal backup process, the regular DP protection storage 406 will store the user content data (usually deduplicated), and will query the CDPT to determine if the Gold image data for the OS and applications for the clients resides in the CDPT. If so, the DP target 406 system will leverage that previously and centrally stored 408 data instead of storing it in the general purpose data protection target 406. This will facilitate a savings in the overall size of the data protection environment. In system 402, the DP target system 406 is provided as storage devices for storing user content data generated by one or more data sources deployed as clients running one or more operating system and application programs. The CDPT 408 is provided as storage devices accessible to but separate from the DPT storage 406 for storing Gold image (structural) data for the one or more operating system and application programs.

Figure 6:
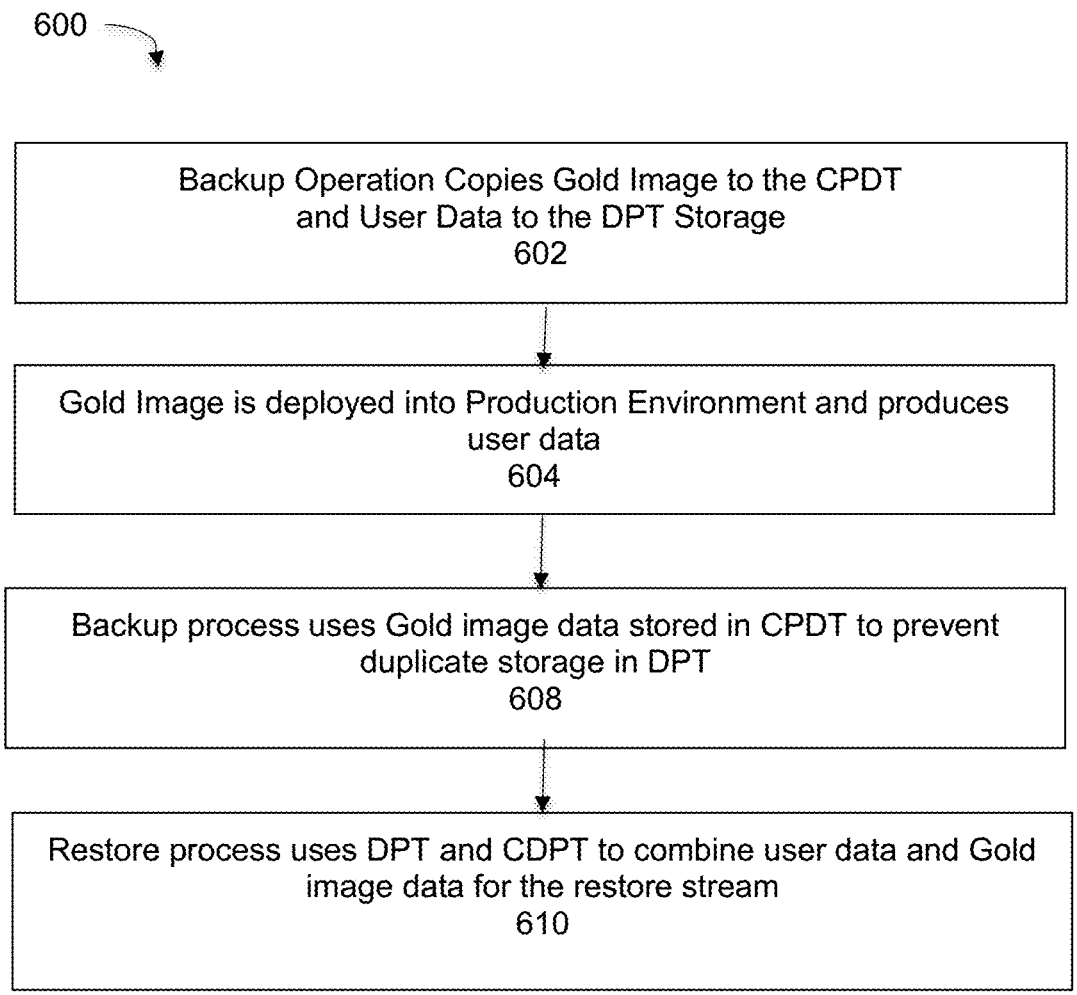
FIG. 6 is a flowchart that illustrates an overall method of using a CPDT to store Gold image data for data protection, under some embodiments.

FIG. 6 is a flowchart that illustrates an overall method 600 of using a CPDT to store Gold image data for data protection, under some embodiments. As shown in FIG. 6, Gold images are first backed up to the CDPT, 602. This is done in a backup operation 521 that also backs up content data from the client VM to the data protection storage (DPT). The Gold image is then deployed and placed into the production environment, typically comprising one or more VMs (e.g., 108), and starts producing user data, 604. During normal data protection backup operation, the user data from the VMs is copied to DP targets in the backup operation of 602. In previous systems, this backup would copy all files including user content and Gold image data from the client VMs to the DP targets. If the same Gold image data is deployed on many VMs, the DP targets would store a great deal of redundant data. For the embodiment of FIG. 6, the backup process instead uses the single Gold image data stored in the centralized CDPT to prevent this duplicate storage of the Gold image data in the DP targets, 608. When the data protection process involves a data restored from the DP targets back to the original or different VMs, the restore process simply involves combining the user data from the DP targets with the Gold image data from the CDPT to form the restore stream, 610.

Method 600 of FIG. 6 uses certain chunk data structures stored in the DP targets 406 and CDPT 408 to reference stored Gold image data that is used for the content data stored in the DP targets. The CDPT stored Gold image data is referenced in the DP targets to prevent redundant storage of this data in the DP targets, since it is already stored in the DCPT. During a backup operation, the DP target queries the CDPT to determine if the Gold image data for the client already exists in the CDPT. If it does already exist, the DP target will not store the Gold image data in the DP target, but will instead use the reference to indicate the location of the Gold image data corresponding to the backed up user content data. Backups of the production VM will look to see if the data exists on the DP target. If it does not exist there, then the CDPT is checked for the data. If it exists on the CDPT a remote chunk is created. If it does not, then a regular local chunk is created.

In a standard data protection storage system, the stored data is saved in a chunk data structure comprising the data itself, a hash of the data, and a size value. In general, files for the Gold image data are different from the files for the user content data. Thus, the data stored in a data structure for the Gold image data is separate and distinguishable from the data stored in the data structures for the content data.

Figure 5A:
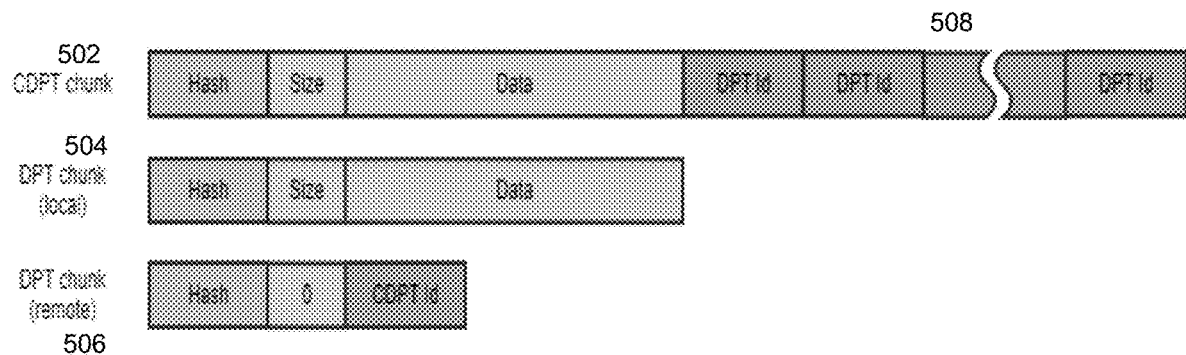
FIG. 5A illustrates a chunk data structure for storing content and Gold image data, under some embodiments.

FIG. 5A illustrates a chunk data structure for storing content and Gold image data, under some embodiments. As shown in FIG. 5A, DPT chunk 504 for each client 404 storing data in DP targets 406 comprises the Hash_Size_Data for each client instance in a data structure, as shown. This is referred to as a 'local' chunk with respect to the DPT storage 406 and stores the data for files comprising the content data for respective VM clients. The Size field in local DPT chunk 504 is always a non-zero value as it represents the size of the data that is stored locally on the DP target. Thus, local chunks stored in the DPT will have a non-zero size field and chunk data.

In order to support the use of the CDPT 408, the chunk data structure is augmented as shown for data structure 502. The CDPT chunk 502 comprises the hash, size, and data, and also a list of zero or more DPT IDs 508. Each entry in this DPT ID list will refer to a specific DP target that references a particular chunk. As there is no reference counting, this DPT ID list will contain a DPT ID either zero or one time exactly. A DPT ID 508 can be a standard device ID, such as a universally unique identifier (UUID) or similar.

The remote DPT chunk 506 is stored in the DP target 406 and refers to a remote chunk on a CDPT device. In this chunk data structure, the Size field is zero, as it references the remote CDPT through the CDPT ID for the CDPT device where the chunk data resides. The Gold image data stored in the CDPT target 408 is thus referenced within the DP target by remote DPT chunk data structure 506 that comprises a hash, a zero Size field, and the CDPT ID. FIG. 5A illustrates different variants of the chunk data structure based on its location, i.e., stored in the DPT or CDPT. Thus, on the DP target, the local DPT chunk 504 Size field is always non-zero and indicates the size of the data stored locally on the DP target, while the remote DPT chunk 506 Size field is always zero as there is no data stored locally for the Gold image, since it is store remotely on the CDPT as the CDPT chunk 502.

Figure 5B:
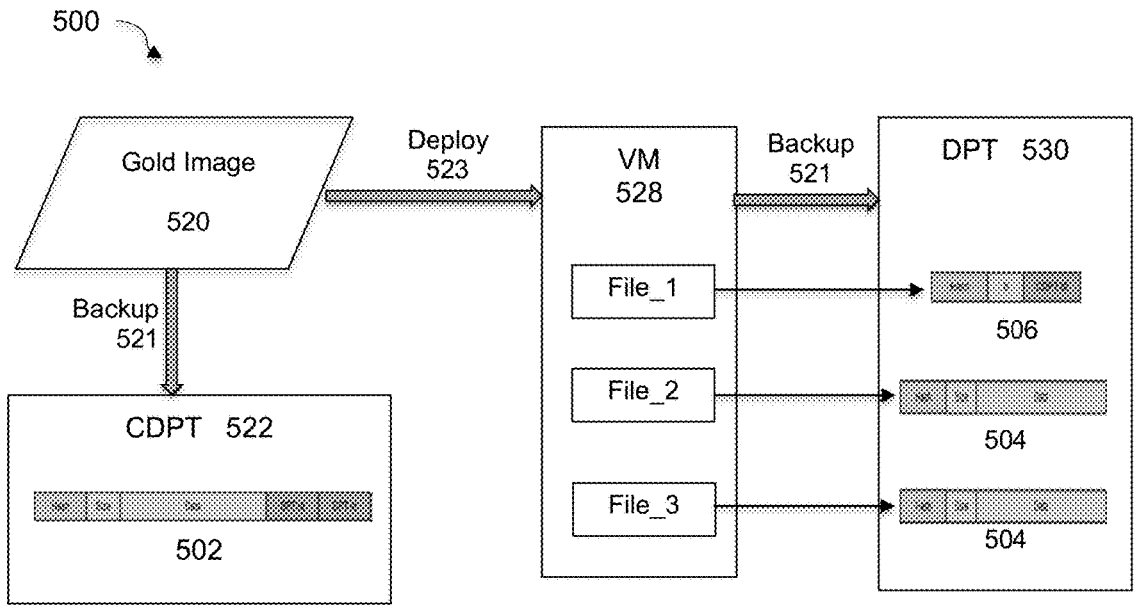
FIG. 5B illustrates storage of chunk data structures in the CDPT and DPT, under some embodiments.

FIG. 5B illustrates storage of chunk data structures in the CDPT and DPT, under some embodiments. As shown in system 500, Gold image data 520 is stored in CDPT 522 during backup operation 521. This backup operation also copies content data from VM client 528 to DPT storage 530. The data structure storing this data uses the CDPT chunk data structure 504 of FIG. 5A. This Gold image is then deployed 523 to client VM 528. During use of the OS and applications of the Gold image, certain user data is generated, thus deployment and use generates several files, denoted File_1, File_2, File_3, and so on. In the example of FIG. 5B, File_1 comprises the Gold image data for Gold image 520, while the other files (File_2 and File_3) are content data files. During a backup operation 521, these files are copied to DP target 530 for storage. The content data for files File_2 and File_3 are stored in the DPT using the DPT chunk data element (local) 504 of FIG. 5A. The Gold image data of File_1 is already stored in CDPT 522 in chunk data structure 502, thus it does not need to be stored again in DPT 530. Instead, the Gold image data is referenced within DPT 530 though DPT chunk (remote) 506, indicating that the Gold image data for VM 528 is available remotely in CDPT 522. In this case, the Gold image data of File_1 is only stored as a hash value and a CDPT ID referencing CDPT 522. The size field is set to '0' indicating that no data is stored for File_1. This prevents redundant storage of the data in CDPT chunk data structure 502. With respect to the CDPT chunk data structure 502 stored in CDPT 522, the DPT ID fields 508 contain the identifiers for DPT 530 and any other DP targets (not shown) that may reference this Gold image data.

Figure 7A:
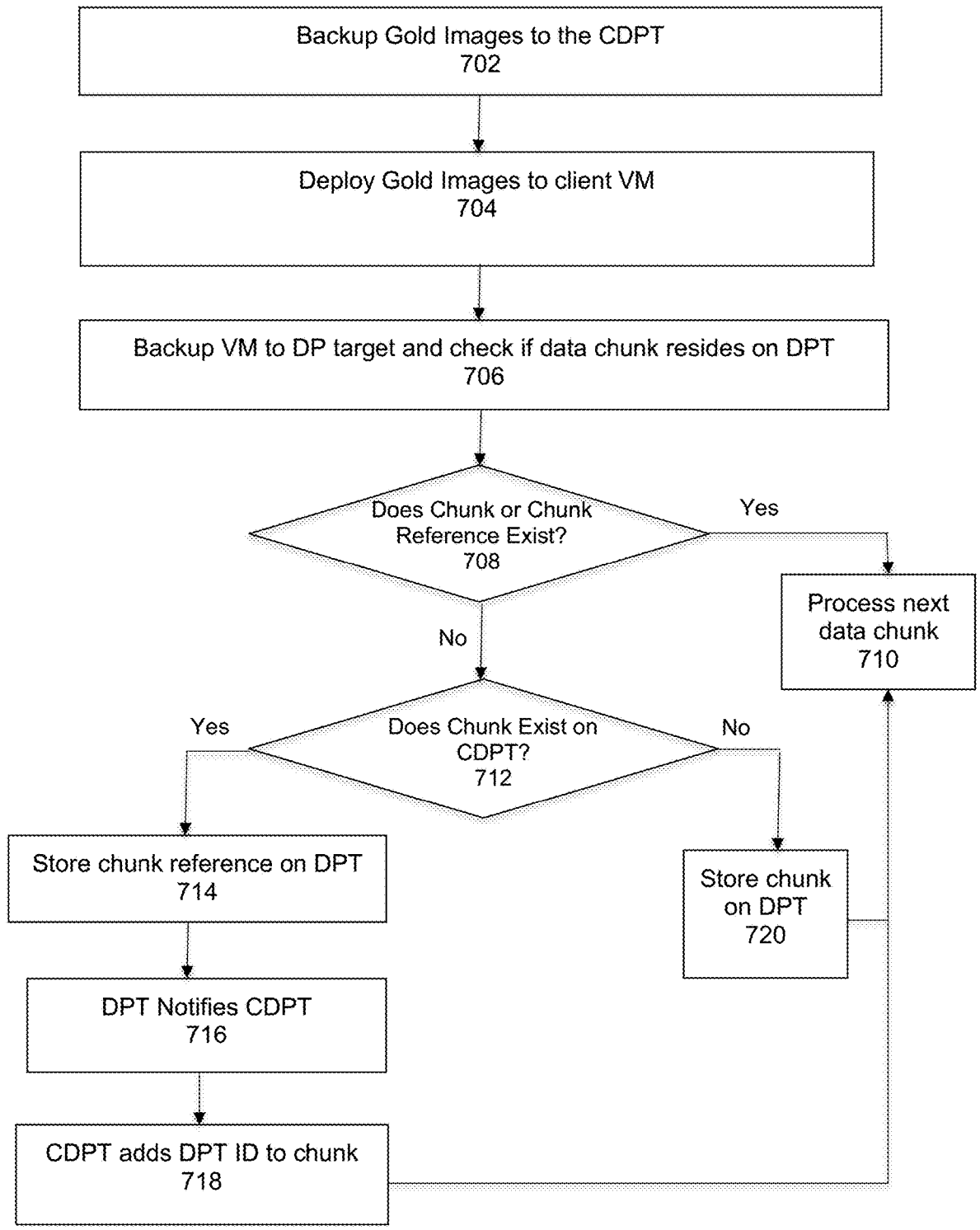
FIG. 7A is a flowchart that illustrates a backup process using a common data protection target for Gold images, under some embodiments.

FIG. 7A is a flowchart that illustrates a backup process using a common data protection target for Gold images, under some embodiments. As shown in FIG. 7A, Gold images are backed up to the CDPT 408 as part of the data protection operation, 702. In step 704, the Gold image is deployed by the user to the client. The data protection operation also backs up the client VM to the DP target 406. Upon backup, the process checks to see if a data chunk or data chunk reference for this backed up data already resides on the DPT, 706. If, in step 708, it is determined that the chunk data or the chunk reference exists on the DPT, the next data chunk is processed in loop step 710. If, in step 708, it is determined that the chunk or chunk reference does not exist on the DPT, the process next determines whether or not the chunk exists on the on the CDPT 408, as shown in decision block 712. If the chunk does not exist on the CDPT, the data chunk is stored on the DPT, step 720, and the next data chunk is processed, 710.

If, in block 712 it is determined that the chunk does exists on the CDPT, the process stores the chunk reference on the DP target containing only the chunk's hash, the identifier of the CDPT where the data resides and a size of zero, 714 (signifying an empty data field in this case). The DP target will then notify the CDPT that the chunk is being used and provides the ID of the DP target, 716. The CDPT will then add the ID of the DP target to the chunk on the CDPT, 718, and the next data chunk is then processed, 710. Each data chunk on the CDPT is augmented with a data structure that has a list of identifiers for each regular DP target (DPT) that refers to any CDPT chunk one or more times, as shown in FIG. 5A.

During backup, the DP target 508 may either examine the CDPT system 408 for the data in real-time or (as one optimization), land the data locally on the DP target for performance considerations. If a DPT does initially land the data locally, it will retain a list of the hashes that have not yet been examined for existence on a CDPT. This will enable an off-line process to examine a bulk of hashes collectively at a later point in time in order to check if they exist remotely. For hashes found remotely, as described above, the DPT ID is added to the DPT ID list 508 from the chunk on the CDPT (if it is not already in this list). After that is completed, the local DPT chunk 504 has its data portion removed, the CDPT ID is added, and the 'size' field is set to zero.

With respect to restore processing, as data sources age, they typically contain much more private data than the common CDPT data. That is the user content data grows at a much greater rate than the relatively static Gold image data. Therefore the extra access time required to retrieve any remote data related to the baseline Gold image is generally not a major detriment to restore speed.

Figure 7B:
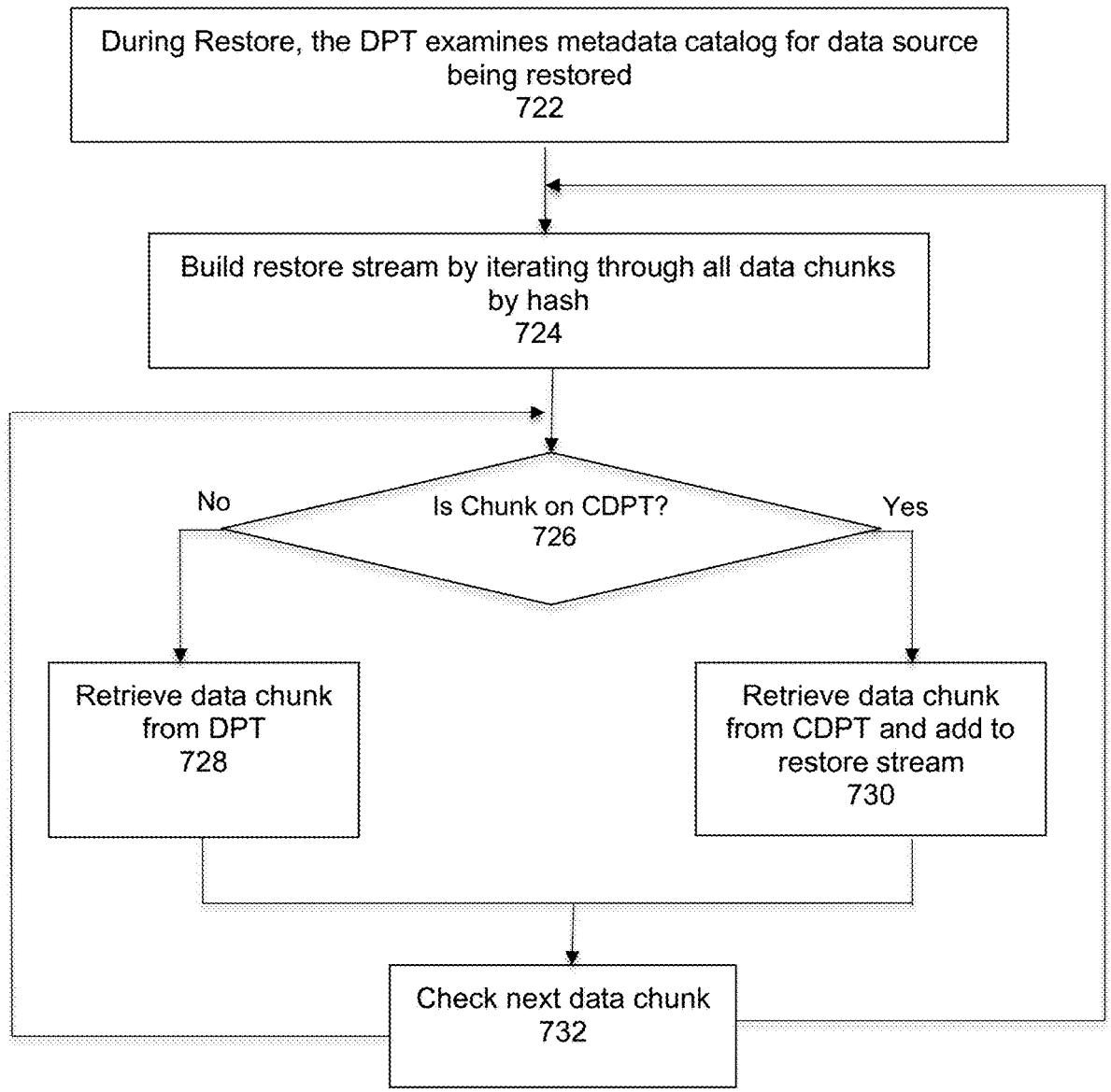
FIG. 7B is a flowchart illustrating a method of performing a data restore operation using a CDPT system, under some embodiments.

FIG. 7B is a flowchart illustrating a method of performing a data restore operation using a CDPT system, under some embodiments. During a restore operation, the DP target 406 examines the metadata catalog for the data source (client) being restored 404, step 722. It will iterate though all of the chunks by hash in order to build the restore stream, 724. If a chunk is not on the CDPT, as determined in step 726, the process will retrieve the data chunk from the DPT 728 check the next data 732. For chunks that are on the CDPT 408, the DP target 406 will retrieve those chunks from the CDPT and use them to add to the restore stream, 730. The next data chunk will then be checked 732.

The Gold image library and CDPT system minimally impacts or even enhances certain garbage collection functions of system 100. In general, garbage collection (GC) is a regularly scheduled job in deduplication backup systems to reclaim disk space by removing unnecessary data chunks that are no longer being referenced by files that were recently modified or deleted. On the DP target system 406, garbage collection is performed as under normal GC procedures to identify and remove unnecessary data chunks. A DPT chunk exists while it is being referenced (regardless if the chunk is local or remote). When there are no longer any references to a chunk detected, the chunk is removed locally. For the embodiment of FIG. 4, this removal is also communicated to the remote CDPT system 408. The CDPT system is given the hash and DPT ID and will remove the DPT ID from that chunk. On the CDPT system, only chunks that have no DPT ID records can be examined for possible garbage collection. For chunks that meet this test, the CDPT system may remove the chunk when there are also no local references. This enables all systems to perform garbage collection nearly independently of each other.

In an embodiment, system 402 of FIG. 4 also implements a CDPT registry. In order for a DP target system 406 to know which CDPT devices 408 it can access, each DP target system will hold a local registry of the valid CDPT systems that it may leverage for remote data. Any practical number of CDPT systems may be used, but in normal system implementations, a single CDPT system will usually be sufficient for most environments.

The CDPT process can be optimized in at least one of several different ways. For example, as the CDPT 408 only contains Gold images that only house static OS and/or installed applications (as opposed to dynamically generated data after a client is entered into service), there is no value to checking the CDPT for data existence after the first backup. There are multiple methods that can assist in this process. One is to build a cache, such as a file cache and/or data cache, when Gold images are backed up to the CDPT 408. When a Gold image is deployed, the caches are also propagated to the deployed instance. The backup software can check these caches and avoid any network traffic for this known static data which resides in the cache. This can apply to every backup of a client. The system only checks data chunks for existence in the CDPT during the first backup as the static data only needs to be checked once. Dynamically building a data cache during backup allows a client to pull a cache (partial or full) from the CDPT.

As another optimization, the restoration process (e.g., FIG. 7B) can retrieve data from two separate locations simultaneously. The Gold image static data can be retrieved from the CDPT 408 while the dynamic data will come from the DP target 406.

Certain DP target post processing steps can be optimized. During a protection operation, clients send their data to the DP target 406. In order to minimize network traffic and complete the backup as quickly as possible, all data lands on the DP target in its fully expanded form (stored as local to a DP target). A list of the hashes that need to be checked are maintained. Periodically, this hash list is queried against the connected CDPT server(s). If the data is found, the local instance is converted to a remote instance and the CDPT registers the DPT as a consumer of the relevant hashes. Similar to the above client optimization, a cache of hashes can be maintained locally which is either build dynamically on the fly or copied periodically from the CDPT.

Another optimization is to use a secondary (common) data protection target that works in conjunction with the regular DP targets 406 in order to minimize duplication of data. This process augment data chunk structures to indicate where data resides (local or remote with the remote's ID). Clients may indicate when a first backup is performed as that is when the highest likelihood of data on a common data protection target will be encountered for the first time. This will avoid unneeded communication with the CDPT and improve performance.

Hash Migration

As described above, the Gold Image library management system reduces the overall storage capacity required for backups in a user environment by storing backups of the Gold Images used as templates for VMs and physical machines on one or more Common Data Protection Targets. Each CDPT or other Data Protection Target (DPT) is assigned an ID number, and data backed up to a CDPT or DPT is split into chunks, each of which is uniquely identified by the cryptographic hash of its contents.

To preserve backup performance and minimize network traffic, a backup of a given asset may be sent directly to any DPT. This means that any of the target storage devices in FIG. 1 (i.e., 104, 108, 114, etc.) may be used as a backup target. Data being backed up should be able to be sent to any DPT for storage, since best target is usually not known for purposes of load balancing, storage type or proximity for restores and so on. In such a system, there is almost some degree of copy duplication, as unnecessary data is copied to some DPTs.

Such a system requires a way to identify when unnecessarily stored data is present on some of the DPTs. Present methods add a reference to the CDPT to indicate where data is reused, and the delete data from DPT where it is unnecessarily stored. For this case, each DPT maintains a list of hashes for the chunks added by the backup operations. The hashes on the DPT are periodically compared to hashes present on connected CDPTs. If a hash from a DPT is present on a CDPT then the CDPT adds the DPT's ID to its entry for the hash, the DPT converts its entry for the hash to reference the CDPT, and the DPT deletes its local copy of the data. In this present implementation, each DPT sends a list of hashes to each CDPT. This is a rather simplistic solution in which every single target is checked, and while the DPTs can gain some efficiencies by adding to the list as backups are added to the system, this present method still a significant amount of bandwidth due to an excessive amount of data sent to all of the DPT and CDPT systems.

Embodiments of a CDPT hash migration process overcome this inefficiency by not sending all of the data to all the targets, but instead efficiently sending a much smaller amount of data from CDPTs to DPTs, which DPTs then use to determine what data might be a candidate for removal. This allows communication between specifically identified CDPTs and DPTs to perform the interaction needed to delete local copies from the DPTs.

Embodiments of the hash migration process ensure that all DPTs are aware of the data on CDPTs in the network. The migration of data essentially comprises a consolidation of the data into the CDPTs, and is performed as a periodic process that is not necessarily done after each backup or each individual data storage request. This enables a load balancing feature (described below), where data can be sent to any DPT (e.g., the least busy one) and ingested as quickly as possible, knowing that the excess data will later be removed by the same general process to regain the storage efficiency.

In an embodiment, a Bloom filter is used, where each DPT has a copy of the Bloom filters of each CDPT. When a DPT processes a hash (representing data from a backup client), it checks the Bloom filters it received from CDPTs to determine whether or not the data may exist on the CDPTs. A Bloom filter is a probabilistic filter in which a check (e.g., of a hash value) returns the result of (1) negative if the data does not exist on the CDPT, or (2) positive if there is an X % chance that it does exist. The Bloom filter thus returns a result that may be a false positive, but it never returns a false negative result. A Bloom filter can be tuned to any number of bits in length to control the target false positive rate. The more bits that are used, the lower the false positive rate, but the more storage and network resources consumed to store and transmit the filters. For example, a 64-bit Bloom filter may return a 95% positive return rate and a 5% false positive return rate, while a 32-bit Bloom filter may return a slightly greater false positive return rate.

In the context of the Gold image library management system, the use of Bloom filters allows much less data to be sent within the system. For example, instead of sending the entire data set, such as all 160-bit hash values from every DPT to every CDPT, the DPT checks the Bloom filter for each CDPT to determine if the data may exist or definitely does not exist on certain CDPTs. If the Bloom filter check returns a possible positive result, the hash value is then sent to the candidate CDPT, where it is checked against the stored hashes. If this check passes, then the CDPT is storing the data segment, and the CDPT updates its entry for the hash of the data segment to add the DPT ID, through the process described above. If the Bloom filter check of the hash value from the local DPT returns negative, then there is no need to further process this data hash. This results in a totally deterministic process that is very efficient with respect to data sent among large numbers of storage targets.

Figure 8:
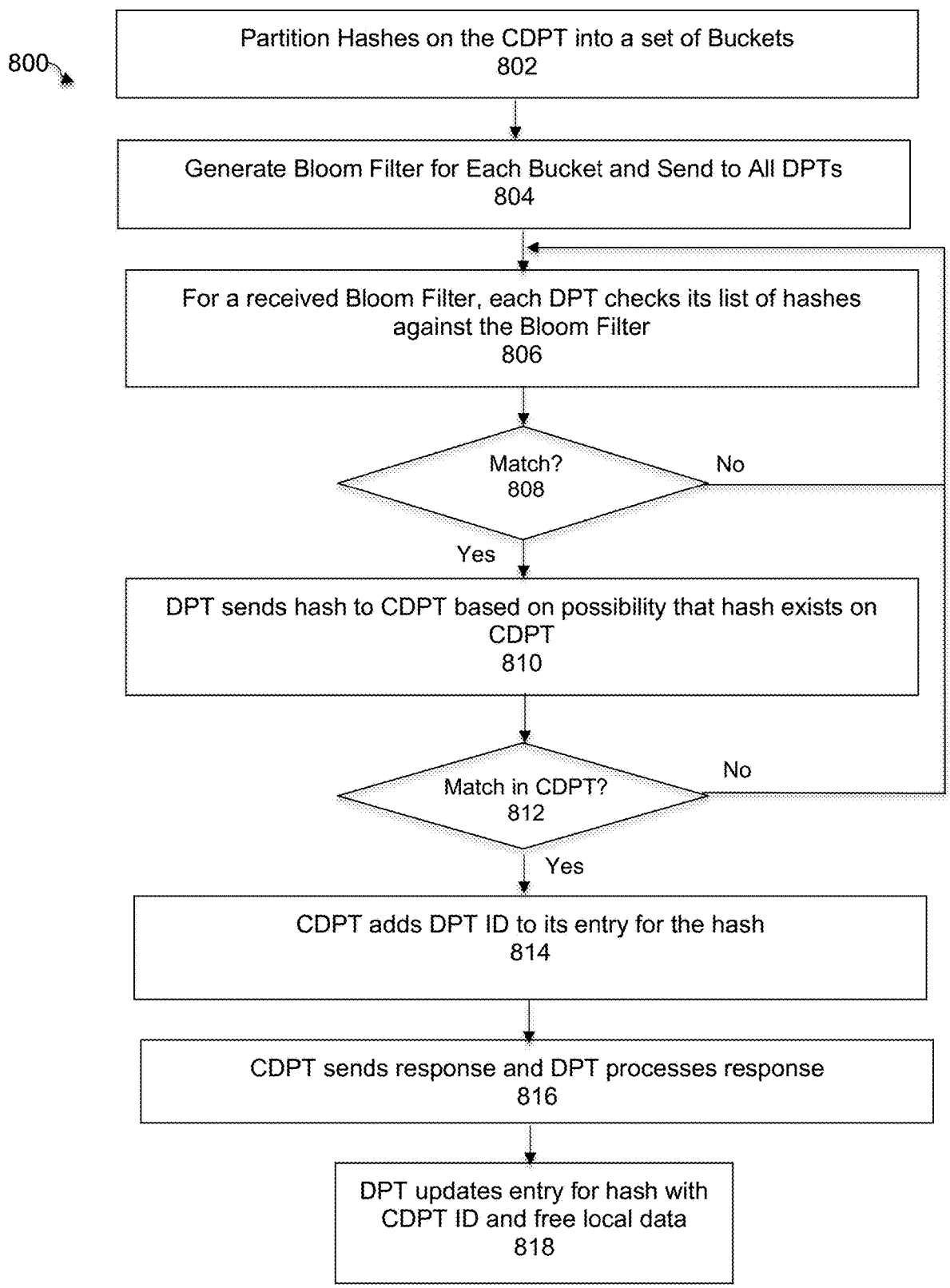
FIG. 8 is a flowchart illustrating a CDPT hash migration process, under some embodiments.

FIG. 8 is a flowchart 800 illustrating a CDPT hash migration process, under some embodiments. As shown in FIG. 8, the hashes on the CDPT are partitioned into a set of N buckets using the first M bits of the hash as the index into the bucket ($2^M$=N), 802. A Bloom filter is generated for each bucket of hashes, and are sent from the CDPT to all DPTs in the environment, 804. Upon receipt of a hash value indicating a request for data corresponding to that hash, each DPT then checks its list of hashes against the Bloom filters, 806. All hashes on the DPT are checked, since the CDPT may have itself added new hashes since the last time it sent Bloom filters.

As determined in decision block 808, if a check of a hash against a Bloom filter for a DPT is a match, the DPT sends the hash to the CDPT as there is the possibility that the hash exists on the CDPT, 810. If, in step 808, it is determined that there is no match, the process simply processes the next hash received for the DPT 806, since Bloom filters may generate a false positive but never a false negative.

After the DPT sends the hash to the CDPT 810, the process checks whether or not there is a match of the hash in the CDPT 812. To further minimize network traffic, the hashes from many DPTs may be batched into messages in the CDPT, and the CDPT processes each message with one or more hashes that it receives from these DPTs in step 810.

If there is a match in decision block 812, the CDPT adds the DPT ID to the entry for the hash if it has an entry for that hash, 814. If there is not a match for the CDPT in 812, then no further processing of this hash is performed and the system simply processes the next hash from step 806. After adding the DPT ID to the entry for the hash in the CDPT (step 814), the CDPT then sends back a response message to the DPT indicating that it updated its entry with the DPT ID, and the DPT (or each DPT in a batch) processes this response message, 816. When the DPT receives the response from the CDPT, the DPT will update its entry for the hash with the CDPT ID and free the local data, 818 thereby converting the local reference to a remote reference.

The parameters of the Bloom filter may be tuned to minimize the rate of false positives while still reducing network traffic. Similarly, the time between each run of this process may be tuned, or it may be set to run only before certain maintenance operations are performed to balance the space saved with the additional network traffic required by the process itself.

Process 800 generally provides a method of migrating hash values for backup data blocks in a network of data protection targets (DPTs) and a common data protection target implementing a Gold image library management system in which backups of Gold images used as templates for physical machines and virtual machines are stored on the CDPT. In this system, the CDPT and each DPT stores backup data split into chunks that are uniquely identified by a respective hash of its contents, and maintains data structures comprising the hash, chunk size, chunk data, and a list of DPT and CDPT identifiers. The process 800 partitions the hashes into a set of buckets in the CDPT, generates a Bloom filter for each bucket of hashes, and stores in each DPT the generated Bloom filters, so that each DPT stores Bloom filters for all the CDPTs in the network. In response to data storage requests, each target DPT can process the request immediately, periodically checking its list of hashes against the Bloom filters from each of the CDPTs. This allows data stored on the DPT to be kept if it is unique data, and freed if it's Gold image data already stored on a CDPT.

Embodiments of process the hash migration process may be used to implement load balancing of backup data in system 100. Given that this system migrates hashes efficiently, the backup software integrated with a set of CDPTs and DPTs can initially place data in a distributed fashion across DPTs based on other factors like available stream count, available capacity, or network latency/throughput from the source, all without negatively affecting the space saving features of the CDPT. As new DPTs are added into the environment, they implement the CDPT hash migration process of FIG. 8 to ensure that newly added data is compared against the CDPTs in the environment.

Figure 9:
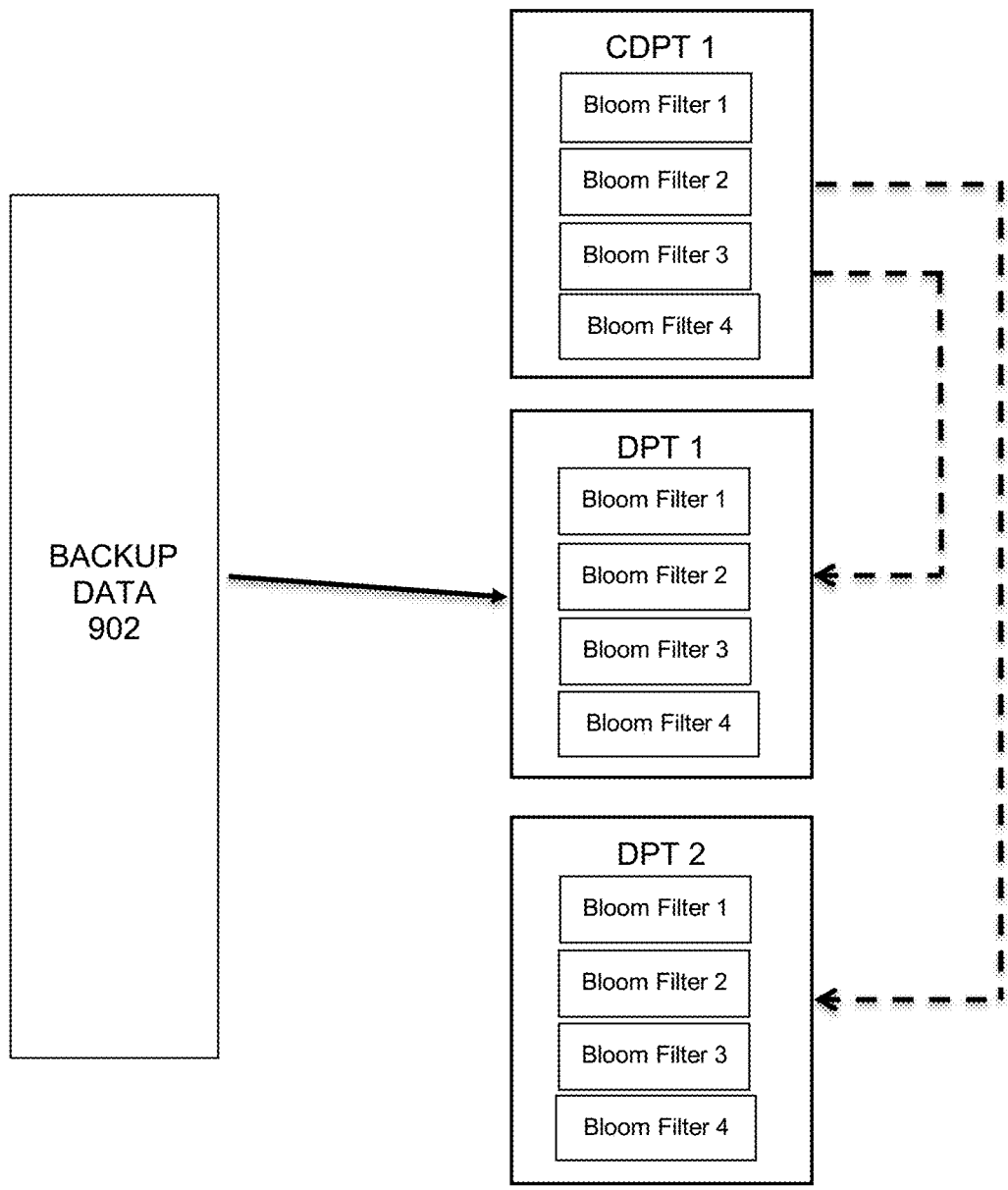
FIG. 9 illustrates a load balancing process using hash migration, under an example embodiment.

FIG. 9 illustrates a load balancing process using hash migration, under an example embodiment. As shown in FIG. 9, backup data 902 is initially directed to backup target, DPT 1 for storage. In the example of FIG. 9, three different backup targets CDPT 1, DPT 1, and DPT 2 are provided, though any practical number may be used. CDPT 1 stores Gold image backup data. CDPT 1 partitions its hashes into 4 ($2^2$) buckets (i.e., buckets where the first two bits of the hash are '00', '01', '10', and '11', respectively) and creates four Bloom filters (1, 2, 3, and 4) to send to each of the DPTs. For the example of FIG. 9, the target DPT 1 will perform a check of the backup data 902 against each of the Bloom filters 1, 2, 3, and 4, as shown in FIG. 8. If there is no match between the hash for a segment of data 902 and any Bloom filters, DPT 1 will store that segment of backup data. Otherwise, if there is a match, it will send the hash for the segment to CDPT 1 and keep or free the data as per the process shown in FIG. 8.

The process 800 therefore allows load balancing among DPTs by distributing backups among the DPTs based on load balancing factors including available stream count, network latency and data throughput from the client data source, and other relevant factors, before efficiently freeing any redundant data that has already been consolidated into the CDPTs.

Although FIG. 9 illustrates an embodiment with only CDPT (CDPT 1) and two DPTs, it should be noted that any number of CDPTs and DPTs can be included, with each DPT holding Bloom filters for each and all of the CDPTs in the system.

Embodiments of the hash migration process can also be used to implement point-to-point copies. Data protection targets often have the ability to natively copy data from one instance to another, as part of operations like replication or migration. Those operations may be driven by the data protection target itself or by backup software writing to the DPTs or CDPTs. Point-to-point copies may be performed from any source to any target, such as from one DPT to another DPT, one CDPT to a DPT, or one CDPT to another CDPT. These point-to-point copies rely on the source's information about which chunks are available remotely (e.g., on other targets, as shown in FIG. 9). In an embodiment, the CDPT hash migration process 800 above can be initiated prior to the replication or migration operation, to ensure that data is not transmitted over the network and stored locally by the target DPT when it is already available remotely on one or more CDPTs. Whether a full volume or just a set of directories and/or files is copied, ultimately chunks of data are copied from one DPT to another.

Figure 10:
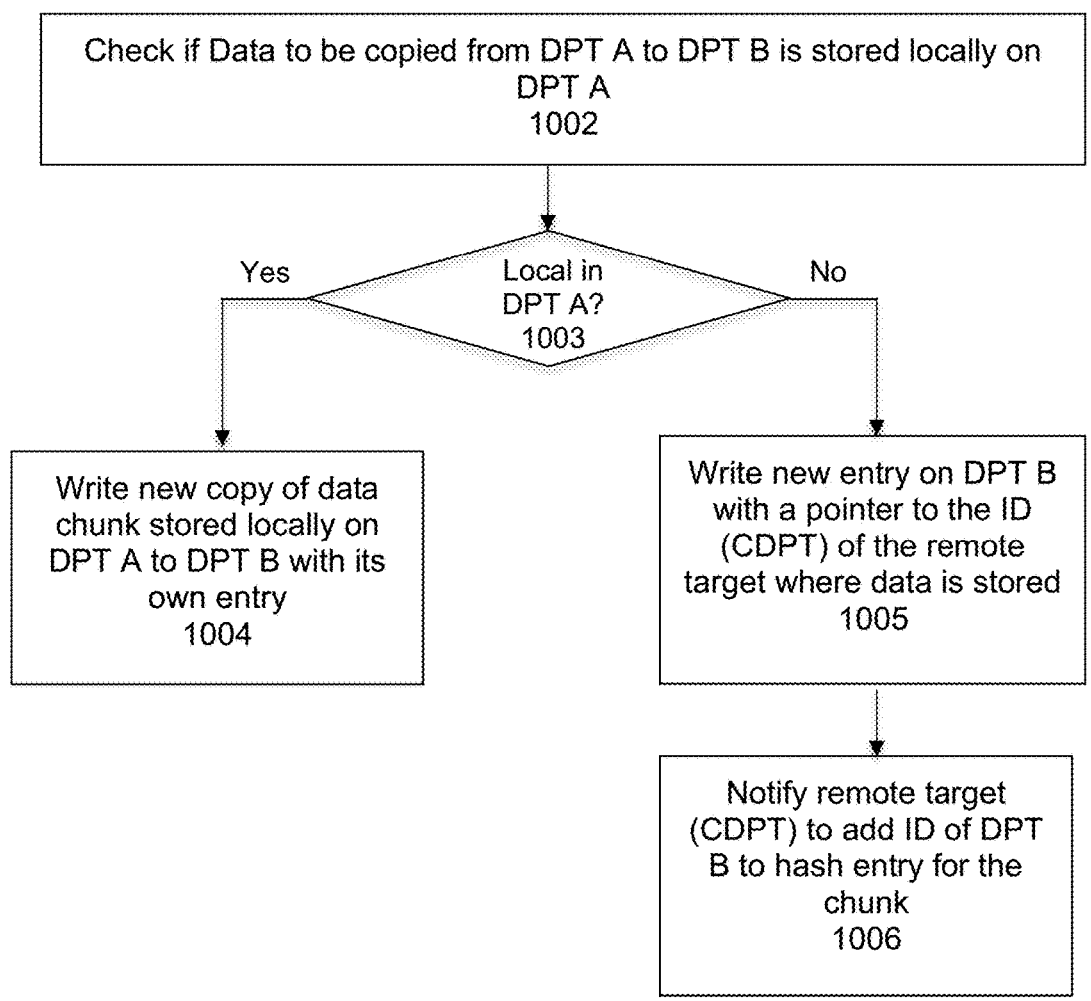
FIG. 10 is a flowchart that illustrates a process of performing point-to-point copies using hash migration, under some embodiments.

FIG. 10 is a flowchart that illustrates a process of performing point-to-point copies using hash migration, under some embodiments. Process 1000 of FIG. 10 illustrates a process executed for each chunk that is copied from DPT A to DPT B, that is between two DPTs. Process 1000 begins by determining if the data to be copied resides, locally on DPT A. If the chunk is stored locally on DPT A, as determined in decision block 1003, then a new copy of the chunk is written on DPT B with its own entry, 1004. If DPT A's entry shows that the chunk is stored remotely on another target (e.g., CDPT X), then a new entry is written on DPT B with only a pointer to the ID of the remote target, 1005. The remote target (CDPT X) is then notified to add the ID of DPT B to the hash entry for the chunk, 1006. FIG. 10 illustrates the point-to-point process if the source is a DPT and the target is a DPT.

For the point-to-point process, each local or remote data chunk is simply copied from DPT A to DPT B. For any chunk that is remote (i.e., exists on a CDPT), the CDPT is informed that DPT B now references this data chunk, which will cause the CDPT to add the ID for DPT B to the chunk reference list. This list will already have included at a minimum the ID for DPT A. These remote chunk updates may be batched together to reduce network traffic.

Either one of both of DPT A and DPT B may be DPT's or CDPT's. The process 1000 is unaffected as a CDPT is simply a DPT that is "assigned" as a CDPT. The target of a copy from a CDPT does not automatically become a CDPT, but copying may be done for other reasons such as creating an instance of the data for recovery from cyber-attacks or other disasters.

With respect to garbage collection, as stated above, garbage collection runs as usual on all replication targets. When chunks are deleted from DPTs, the CDPTs are notified to remove the corresponding chunk references, which greatly simplifies the GC process to an almost trivial operation.

System Implementation

Embodiments of the processes and techniques described above can be implemented on any appropriate backup system operating environment or file system, or network server system. Such embodiments may include other or alternative data structures or definitions as needed or appropriate.

The processes described herein may be implemented as computer programs executed in a computer or networked processing device and may be written in any appropriate language using any appropriate software routines. For purposes of illustration, certain programming examples are provided herein, but are not intended to limit any possible embodiments of their respective processes.

Figure 11:
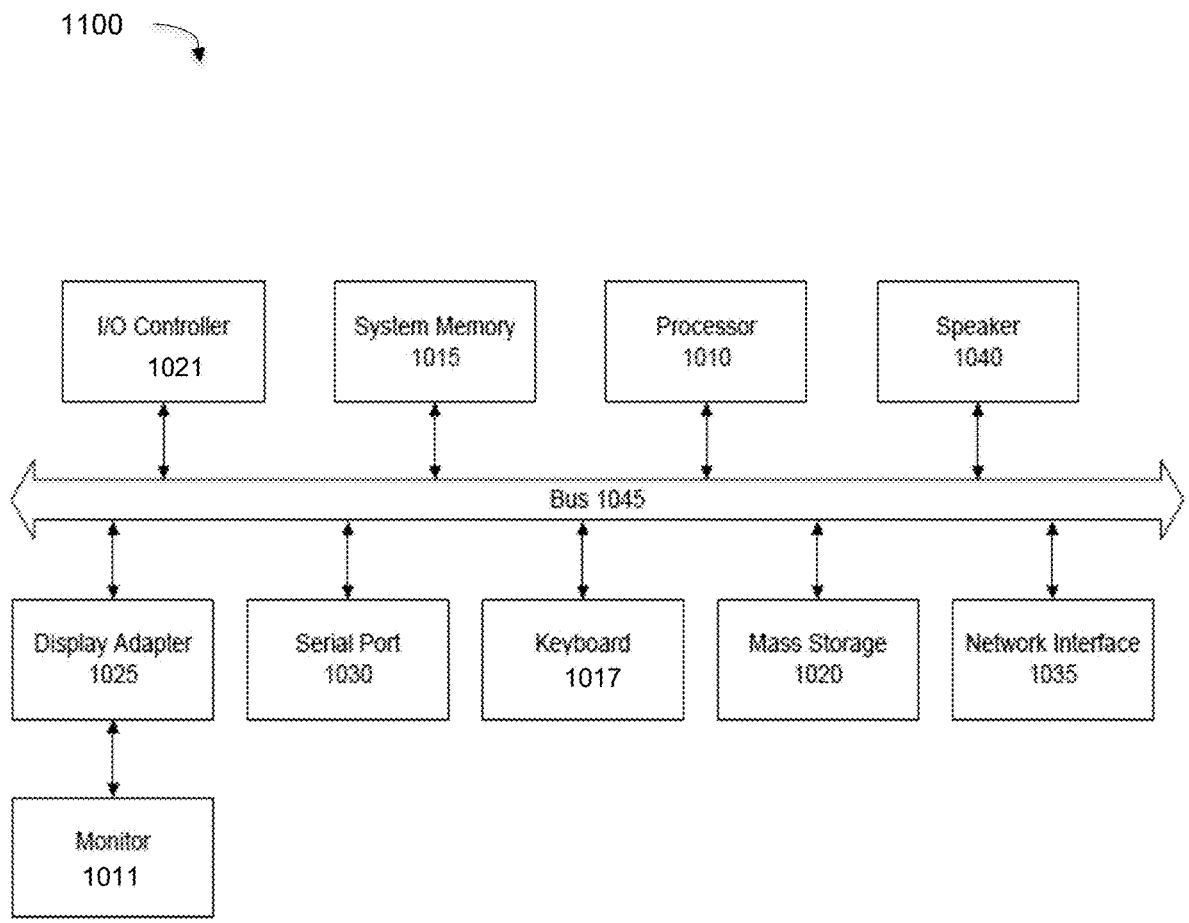
FIG. 11 is a system block diagram of a computer system used to execute one or more software components of a Gold image library management system, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 11 shows a system block diagram of a computer system used to execute one or more software components of the present system described herein. The computer system 1100 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1100 is just one example of a computer system suitable for use with the present system. Other configurations of subsystems suitable for use with the described embodiments will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, 802.11n, 802.11ac, and 802.11ad, among other examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the described embodiments. Additionally, steps may be subdivided or combined. As disclosed herein, software written in accordance certain embodiments may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of migrating hashes for backup data blocks in a network of data protection targets (DPTs), comprising:
   storing the hashes in a common data protection target (CDPT) of the network, and partitioning the hashes into a set of buckets in the CDPT;
   generating a Bloom filter for each bucket of hashes, wherein the Bloom filter comprises a probabilistic data structure that is tunable with respect to size to reduce or increase a possibility of false positives versus an amount of data traffic sent through the network;
   sending to each DPT the generated Bloom filters, so that each DPT stores Bloom filters for the CDPT;
   first checking in a DPT if a hash of the data is matched in a Bloom filter stored in the DPT;
   sending, if there is a match, the hash to the CDPT from the DPT indicating that there is a possibility that the hash exists in the CDPT; and
   second checking, in the CDPT, whether the hash exists, and wherein the network implements a Gold image library management system storing backups of Gold images used as templates for physical machines and virtual machines on the CDPT, and wherein the CDPT and each DPT stores backup data split into chunks that are uniquely identified by a respective hash, and maintains data structures comprising the hash, chunk size, chunk data, and a list of DPT and CDPT identifiers.

2. The method of claim 1 wherein the set of buckets comprises N buckets using a first M bits of the hash as an index into a respective bucket, such that $2^M=N$.

3. The method of claim 1 further comprising, prior to the second checking:
   adding, in the CDPT, the DPT ID to an entry for the hash;
   sending, from the CDPT to the DPT, a response message indicating whether or not the hash was a match in the CDPT.

4. The method of claim 3 further comprising, after the second checking:
   processing the response message in the DPT;
   updating in the DPT, if there is a match, the entry for the hash with an identifier of the CDPT;
   freeing local data in the DPT corresponding to the hash; and
   keeping in the DPT, if there is not a match, the hash and the local data.

5. The method of claim 4 wherein the CDPT is configured to batch process hashes received from a plurality of DPTs, and wherein the first checking, sending, and second checking steps are performed for each DPT of the plurality of DPTs.

6. The method of claim 1 wherein the CDPT is provided as a separate storage target from the DPTs, and wherein the Gold image library management system: copies, during a backup operation for a client data source, the user content data from the client to the DPT target and copying the Gold images to the CDPT, and references the structural data in the DPT to prevent redundant storage of the Gold images in the DPT.

7. The method of claim 1 further comprising performing a load balancing operation among the DPTs by distributing newly added data among the DPTs for load balancing factors including available stream count, network latency and data throughput from a client data source and later freeing data that is already stored in the CDPT.

8. The method of claim 1 further comprising performing a point-to-point copy operation between a first DPT and a second DPT, or from the CDPT to the first DPT, by checking if data to be replicated or migrated in the network is already stored in the CDPT.

9. The method of claim 8 wherein the point-to-point copy operation comprises:
   checking if a chunk to be sent to the first DPT, is stored locally on the first DPT, and if so, writing a new copy of the chunk on the second DPT;
   if the chunk is not stored locally, writing a new entry to the second DPT with a pointer to the ID of the CDPT; and
   notifying the CDPT to add the second DPT ID to the hash for the chunk.

10. A method of migrating hashes for backup data blocks in a network of data protection targets (DPTs) and a common data protection target (CDPT) implementing a Gold image library management system, the method comprising:
    storing backups of Gold images used as templates for physical machines and virtual machines on the CDPT, and wherein the CDPT and each DPT: stores backup data split into chunks that are uniquely identified by a respective hash, and maintains data structures comprising the hash, chunk size, chunk data, and a list of DPT and CDPT identifiers;
    partitioning the hashes into a set of buckets in the CDPT;
    generating a Bloom filter for each bucket of hashes;
    storing in each DPT the generated Bloom filters for the CDPT, so that each DPT stores Bloom filters for a respective DPT and the CDPT; and
    checking, in response to a data storage request, a list of hashes in the CDPT against the Bloom filters in each of the DPTs to identify a Gold image among the stored backups of Gold images for shared use by the DPTs.

11. The method of claim 10 wherein the checking step further comprises:
    first checking in a DPT and in response to a backup request for data sent from the CDPT, if a hash of the data is matched in a Bloom filter stored in the DPT;
    sending, if there is a match, the hash to the CDPT from the DPT indicating that there is a possibility that the hash exists in the CDPT; and
    second checking, in the CDPT, whether the hash exists.

12. The method of claim 11 wherein each Bloom filter comprises a probabilistic data structure that is tunable with respect to size to reduce or increase a possibility of false positives versus an amount of data traffic sent through the network.

13. The method of claim 10 further comprising performing a load balancing operation among the DPTs newly added to the network by checking hashes of data chunks in the newly added DPTs against hashes stored in the CDPT, and distributing the newly added data chunks among the DPTs for load balancing factors including available stream count, network latency and data throughput from a client data source.

14. The method of claim 10 further comprising performing a point-to-point copy operation between a first DPT and a second DPT, or from the CDPT to the first DPT, by checking if data to be replicated or migrated in the network is already stored in the CDPT.

15. A system for of migrating hash values for backup data blocks in a network of data protection targets (DPTs) and a common data protection target (CDPT) implementing a Gold image library management system, the system comprising:
  a first CDPT component storing backups of Gold images used as templates for physical machines and virtual machines, and wherein the CDPT and each DPT: stores backup data split into chunks that are uniquely identified by a respective hash, and maintains data structures comprising the hash, chunk size, chunk data, and a list of DPT and CDPT identifiers;
  a second CDPT component partitioning the hashes into a set of buckets in the CDPT, and generating a Bloom filter for each bucket of hashes; and
  a DPT storing the generated Bloom filters locally, so that the DPT stores Bloom filters for a respective DPT and the CDPT, the DPT further checking, in response to a data storage request, a list of hashes in the CDPT against the Bloom filters in each of the DPTs to identify a Gold image among the stored backups of Gold images for shared use by the DPTs.

16. The system of claim 15 wherein the DPT further checks, in response to a backup request for data sent from the CDPT, if a hash of the data is matched in the Bloom filter, and sends if there is a match, the hash to the CDPT from the DPT indicating that there is a possibility that the hash exists in the CDPT, and wherein in response, checking, in the CDPT, whether the hash exists.

17. The system of claim 16 wherein the CDPT further adds the DPT ID to an entry for the hash, and sends to the DPT, a response message indicating whether or not the hash was a match in the CDPT.

18. The system of claim 17 further comprising the DPT processing the response message, updating, if there is a match, the entry for the hash with an identifier of the CDPT, and freeing local data in the DPT corresponding to the hash; otherwise keeping the hash and the local data in the DPT if there is not a match in the CDPT.

* * * * *